(12) United States Patent
Shiogama

(10) Patent No.: US 7,742,791 B2
(45) Date of Patent: Jun. 22, 2010

(54) POSITIONING STRUCTURE, POSITIONING METHOD, CASE AND MOBILE COMMUNICATION TERMINAL

(75) Inventor: Naoki Shiogama, Kakegawa (JP)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 11/220,520

(22) Filed: Sep. 8, 2005

(65) Prior Publication Data
US 2006/0058078 A1 Mar. 16, 2006

(30) Foreign Application Priority Data
Sep. 14, 2004 (JP) ............................. 2004-267299

(51) Int. Cl.
H04M 1/00 (2006.01)
(52) U.S. Cl. .................................. 455/575.1
(58) Field of Classification Search ............... 455/575.1
See application file for complete search history.

(56) References Cited
U.S. PATENT DOCUMENTS
6,728,112 B1 4/2004 Qin et al.

2004/0053647 A1 3/2004 Sun
2004/0174665 A1 9/2004 Mockridge et al.

FOREIGN PATENT DOCUMENTS

| EP | 0 610 689 A1 | 8/1994 |
|---|---|---|
| JP | 59-169082 | 11/1984 |
| JP | 61-061878 | 4/1986 |
| JP | 04-344112 | 11/1992 |
| JP | 09-321463 | 12/1997 |
| JP | 10-260637 | 9/1998 |
| JP | 11-331333 | 11/1999 |
| JP | 2000-223858 | 8/2000 |

Primary Examiner—Yuwen Pan
(74) Attorney, Agent, or Firm—Foley & Lardner LLP

(57) ABSTRACT

In integrally forming a positioning convexity on an inner surface of a case, breakage during a fall and the like is prevented by increasing the strength of the positioning convexity without causing a defective appearance during the molding of the case. In performing the positioning of a top cover and a built-in frame by fitting together a positioning concavity formed in the built-in frame and a positioning convexity which is integrally formed on an inner surface of the top cover, the positioning convexity is formed from a rib in the shape of a box or the like. To lessen stress concentration, the positioning convexity is disposed in the vicinity of a screw fixing section. To improve assemblability, a curved surface or an inclined surface which guides the fitting into the positioning concavity is formed at a leading end of the rib which constitutes the positioning convexity.

20 Claims, 8 Drawing Sheets

POSITIONING STRUCTURE, POSITIONING METHOD, CASE AND MOBILE COMMUNICATION TERMINAL

BACKGROUND OF THE INVENTION

1. Field of the Invention

The present invention relates to a positioning structure and a positioning method which are applied to a mobile communication terminal or the like and, more particularly, to a case and a mobile communication terminal to which the above-described positioning structure is applied.

2. Description of the Related Art

When members are incorporated in a case, it is general practice to position the members to be incorporated by the case (refer to the Japanese Patent Laid-Open No. 11-331333 and the Japanese Patent Laid-Open No. 2000-223858, for example).

However, in the Japanese Patent Laid-Open No. 11-331333 and the Japanese Patent Laid-Open No. 2000-223858, a buffering member or packing is interposed between a casing and incorporated members and, therefore, the number of parts increases, creating a possibility of a cost increase.

Therefore, there have been proposed techniques which involve positioning incorporated members by fitting a positioning convexity integrally formed on an inner surface of a case into a positioning concavity formed in a member to be incorporated (refer to the Japanese Patent Laid-Open No. 04-344112, for example). If such a positioning structure is used, incorporated members can be positioned without an increase in the number of parts.

Hereinafter, a conventional positioning structure which is applied to a cellular phone (a mobile communication terminal) will be described with reference to FIG. 7.

FIG. 7 is a partial sectional view of a cellular phone to show a positioning structure in a conventional example and, concretely, a partial sectional view of a display section in a folding cellular phone.

The appearance of the display section of a folding cellular phone shown in FIG. 7 is composed of top and bottom covers 101, 102 which constitute a case 100, a transparent panel 103 which is fitted into a display window 110a of the top cover 101, and a decorative panel 104 which covers the bottom cover 102. In the interior of the case 100, there are incorporated a display panel 105 which displays characters and the like, a lighting unit 106 which lights the display panel 105 from the back surface thereof, and a built-in frame 107 which holds these members.

The positioning of the built-in frame 107 is performed by fitting together a positioning concavity 107a formed in the built-in frame 107 and a positioning convexity 101b which is integrally formed on the inner surface of the top cover 101. And in the example shown in FIG. 7, the built-in frame 107 is fixed in a co-tightened manner by screws 108 which fix the top cover 101 and the bottom cover 102 together.

Incidentally, in the folding cellular phone shown in FIG. 7, stress is concentrated on the positioning convexity 101b if the case 100 and the built-in frame 107 are deformed by such impacts as cased by a fall. Therefore, it is preferred that strength high enough to withstand stress concentration be imparted to the positioning convexity 101b.

However, if the size of the positioning convexity 101b is increased, a defective appearance such as shrinkage is apt to occur in the molding of the case 100 and, therefore, it is difficult to impart sufficient strength to the positioning convexity 101b, as a result of which there is a possibility that the positioning convexity 101b is broken by such impacts as caused by a fall.

Incidentally, as shown in FIG. 8, it is also conceivable to perform the positioning of the built-in frame 107 by using the periphery of a fixing boss 102a. In this case, however, it is necessary to consider the expansion of the fixing boss 102a by the tightening of the screw 108 and hence there is a limit to positioning accuracy.

BRIEF SUMMARY OF THE INVENTION

The present invention has as its object the provision of a positioning structure, a positioning method, a case and a mobile communication terminal which can resolve the problem that a positioning convexity integrally formed on the inner surface of a case is broken due to such impacts as caused by a fall by increasing the strength of the positioning convexity without causing a defective appearance during the molding of the case in spite of the integral forming of the positioning convexity on the inner surface of the case.

To achieve the above object, the present invention provides a positioning structure which positions an incorporated member which is to be incorporated in a case with respect to the case. This positioning structure is constituted by a positioning concavity which is formed in the incorporated member and a positioning convexity which is integrally formed on an inner surface of the case and positions the incorporated member by fitting into the positioning concavity, the positioning convexity being formed from a rib.

Owing to this construction, even though the positioning convexity is integrally formed on the inner surface of the case, it is possible to increase the strength of the positioning convexity without causing a defective appearance in the case. As a result of this, by imparting strength high enough to withstand stress concentration to the positioning convexity, it is possible to prevent the breakage of the positioning convexity due to a fall and the like.

The positioning structure of the present invention is constructed in such a manner that the positioning convexity is formed from a rib which is continuous in at least two directions.

Owing to this construction, the positioning convexity is formed in rib shapes such as a hollow quadrangle, a hollow triangle, a hollow circle, a cross, an X-shaped configuration, an L-shaped configuration, a Π-shaped configuration and a C-shaped configuration, whereby the strength of the positioning convexity can be increased.

The positioning structure of the present invention is constructed in such a manner that the positioning convexity is formed from a rib which is continuous in an endless manner.

Owing to this construction, the positioning convexity is formed in rib shapes such as a hollow quadrangle, a hollow triangle and a hollow circle, whereby the strength of the positioning convexity can be further increased.

The positioning structure of the present invention is constructed in such a manner that the positioning convexity is disposed in the vicinity of a screw fixing section which fixes at least the incorporated member to the case.

Owing to this construction, it is possible to lessen stress concentration on the positioning convexity when the positioning convexity is subjected to such impacts as caused by a fall. Also, because it is possible to position the screw fixing section of the case and the screw fixing section of the incorporated member with good accuracy, it is also possible to resolve the problem that during tightening, the screw becomes slant and the tightening force of the screw works on the positioning convexity, with the result that the positioning convexity is broken.

The positioning structure of the present invention is constructed in such a manner that a curved surface or an inclined surface which guides the fitting into the positioning concavity is formed in a leading end portion of the rib.

Owing to this construction, fitting together the positioning concavity and the positioning convexity becomes easy and, therefore, it is possible to improve assemblability.

The present invention provides a positioning method for positioning an incorporated member which is to be incorporated in a case with respect to the case. This positioning method involves the steps of: integrally forming a positioning convexity formed from a rib on an inner surface of the case; and fitting the positioning convexity into a positioning concavity which is formed in the incorporated member, thereby positioning the incorporated member.

Owing to this method, even though the positioning convexity is integrally formed on the inner surface of the case, it is possible to increase the strength of the positioning convexity without causing a defective appearance in the case. As a result of this, by imparting strength high enough to withstand stress concentration to the positioning convexity, it is possible to prevent the breakage of the positioning convexity due to a fall and the like.

In the positioning method of the present invention, the positioning convexity is formed from a rib which is continuous in at least tow directions.

Owing to this method, the positioning convexity is formed in rib shapes such as a hollow quadrangle, a hollow triangle, a hollow circle, a cross, an X-shaped configuration, an L-shaped configuration, a Π-shaped configuration and a C-shaped configuration, whereby the strength of the positioning convexity can be increased.

In the positioning method of the present invention, the positioning convexity is formed from a rib which is continuous in an endless manner.

Owing to this method, the positioning convexity is formed in rib shapes such as a hollow quadrangle, a hollow triangle and a hollow circle, whereby the strength of the positioning convexity can be further increased.

In the positioning method of the present invention, the positioning convexity is disposed in the vicinity of a screw fixing section which fixes at least the incorporated member to the case.

Owing to this positioning method, it is possible to lessen stress concentration on the positioning convexity when the positioning convexity is subjected to such impacts as caused by a fall. Also, because it is possible to position the screw fixing section of the case and the screw fixing section of the incorporated member with good accuracy, it is also possible to resolve the problem that during tightening, the screw becomes slant and the tightening force of the screw works on the positioning convexity, with the result that the positioning convexity is broken.

In the positioning method of the present invention, a curved surface or an inclined surface which guides the fitting into the positioning concavity is formed in a leading end portion of the rib.

Owing to this method, fitting together the positioning concavity and the positioning convexity becomes easy and, therefore, it is possible to improve assemblability.

The present invention provides a case in which an incorporated member is to be incorporated, and this case integrally contains a positioning convexity which positions the incorporated member by fitting into a positioning concavity which is formed in the incorporated member. The positioning convexity is formed from a rib.

Owing to this construction, in a case on the inner surface of which a positioning convexity is integrally formed, it is possible to increase the strength of the positioning convexity without causing a defective appearance in the case. As a result of this, by imparting strength high enough to withstand stress concentration to the positioning convexity, it is possible to prevent the breakage of the positioning convexity due to a fall and the like.

The case of the present invention is constructed in such a manner that the positioning convexity is formed from a rib which is continuous in at least two directions.

Owing to this construction, the positioning convexity is formed in rib shapes such as a hollow quadrangle, a hollow triangle, a hollow circle, a cross, an X-shaped configuration, an L-shaped configuration, a Π-shaped configuration and a C-shaped configuration, whereby the strength of the positioning convexity can be increased.

The case of the present invention is constructed in such a manner that the positioning convexity is formed from a rib which is continuous in an endless manner.

Owing to this construction, the positioning convexity is formed in rib shapes such as a hollow quadrangle, a hollow triangle and a hollow circle, whereby the strength of the positioning convexity can be further increased.

The case of the present invention is constructed in such a manner that the positioning convexity is disposed in the vicinity of a screw fixing section which fixes at least the incorporated member to the case.

Owing to this construction, it is possible to lessen stress concentration on the positioning convexity when the positioning convexity is subjected to such impacts as caused by a fall. Also, because it is possible to position the screw fixing section of the case and the screw fixing section of the incorporated member with good accuracy, it is also possible to resolve the problem that during tightening, the screw becomes slant and the tightening force of the screw works on the positioning convexity, with the result that the positioning convexity is broken.

The case of the present invention is constructed in such a manner that a curved surface or an inclined surface which guides the fitting into the positioning concavity is formed in a leading end portion of the rib.

Owing to this construction, fitting together the positioning concavity and the positioning convexity becomes easy and, therefore, it is possible to improve assemblability.

The present invention provides a mobile communication terminal having a case in which a built-in frame is to be incorporated. This mobile communication terminal is constituted by a positioning concavity which is formed in the built-in frame and a positioning convexity which is integrally formed on an inner surface of the case and positions the built-in frame by fitting into the positioning concavity. The positioning convexity is formed from a rib.

Owing to this construction, even though the positioning convexity is integrally formed on the inner surface of the case, it is possible to increase the strength of the positioning convexity without causing a defective appearance in the case. As a result of this, by imparting strength high enough to withstand stress concentration to the positioning convexity, it is possible to prevent the breakage of the positioning convexity due to a fall and the like.

The mobile communication terminal of the present invention is constructed in such a manner that the positioning convexity is formed from a rib which is continuous in at least two directions.

Owing to this construction, the positioning convexity is formed in rib shapes such as a hollow quadrangle, a hollow triangle, a hollow circle, a cross, an X-shaped configuration, an L-shaped configuration, a Π-shaped configuration and a C-shaped configuration, whereby the strength of the positioning convexity can be increased.

The mobile communication terminal of the present invention is constructed in such a manner that the positioning convexity is formed from a rib which is continuous in an endless manner.

Owing to this construction, the positioning convexity is formed in rib shapes such as a hollow quadrangle, a hollow triangle and a hollow circle, whereby the strength of the positioning convexity can be further increased.

The mobile communication terminal of the present invention is constructed in such a manner that the positioning convexity is disposed in the vicinity of a screw fixing section which fixes at least the built-in frame to the case.

Owing to this construction, it is possible to lessen stress concentration on the positioning convexity when the positioning convexity is subjected to such impacts as caused by a fall. Also, because it is possible to position the screw fixing section of the case and the screw fixing section of the built-in frame with good accuracy, it is also possible to resolve the problem that during tightening, the screw becomes slant and the tightening force of the screw works on the positioning convexity, with the result that the positioning convexity is broken.

The mobile communication terminal of the present invention is constructed in such a manner that a curved surface or an inclined surface which guides the fitting into the positioning concavity is formed in a leading end portion of the rib.

Owing to this construction, fitting together the positioning concavity and the positioning convexity becomes easy and, therefore, it is possible to improve the assemblability of the mobile communication terminal.

As described above, according to the present invention, it is possible to increase the strength of a positioning convexity integrally formed on the inner surface of a case without causing a defective appearance in spite of the integral forming of the positioning convexity on the inner surface of the case. As a result, it is possible to prevent the breakage of the positioning convexity due to such impacts as caused by a fall by imparting strength high enough to withstand stress concentration to the positioning convexity.

DETAILED DESCRIPTION OF THE PREFERRED EMBODIMENTS

Hereinafter, a description will be given of a cellular phone (a mobile communication terminal) to which the positioning structure (positioning method) according to an embodiment of the present invention is applied with reference to FIG. 1 to FIGS. 6A to 6H.

Figure 1:
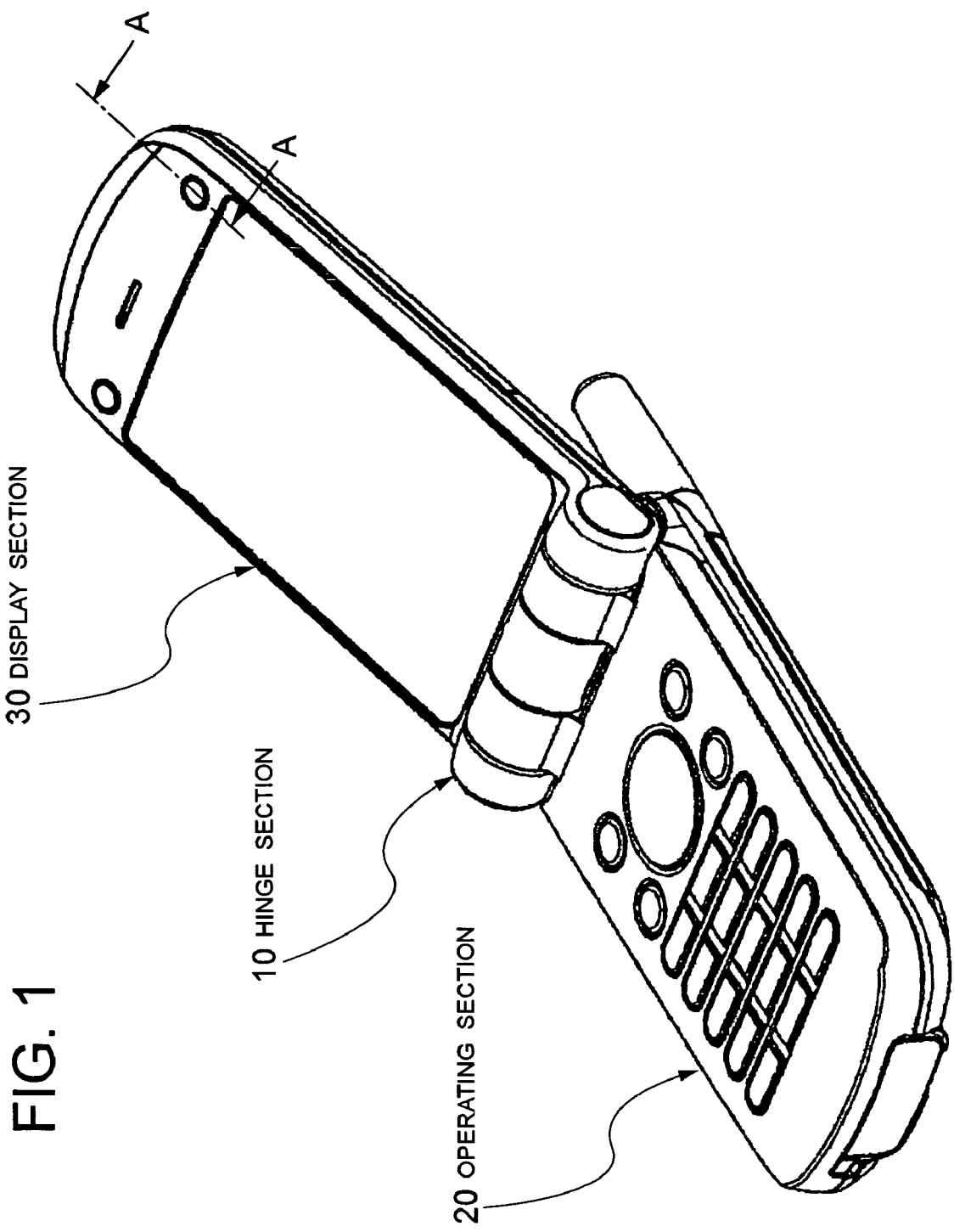
FIG. 1 is a perspective view of a cellular phone.
Figure 2:
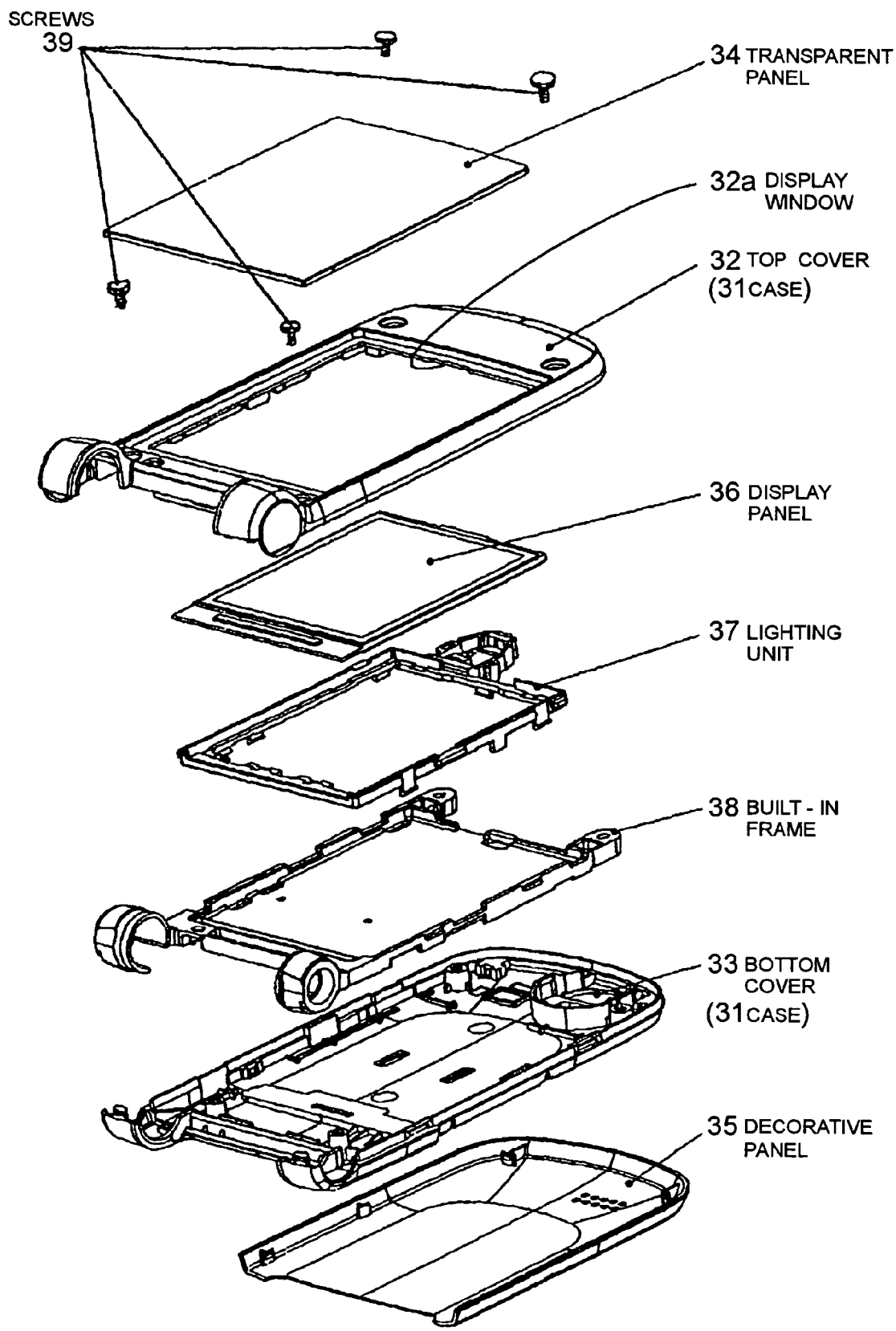
FIG. 2 is an exploded perspective view of a display section.
Figure 3:
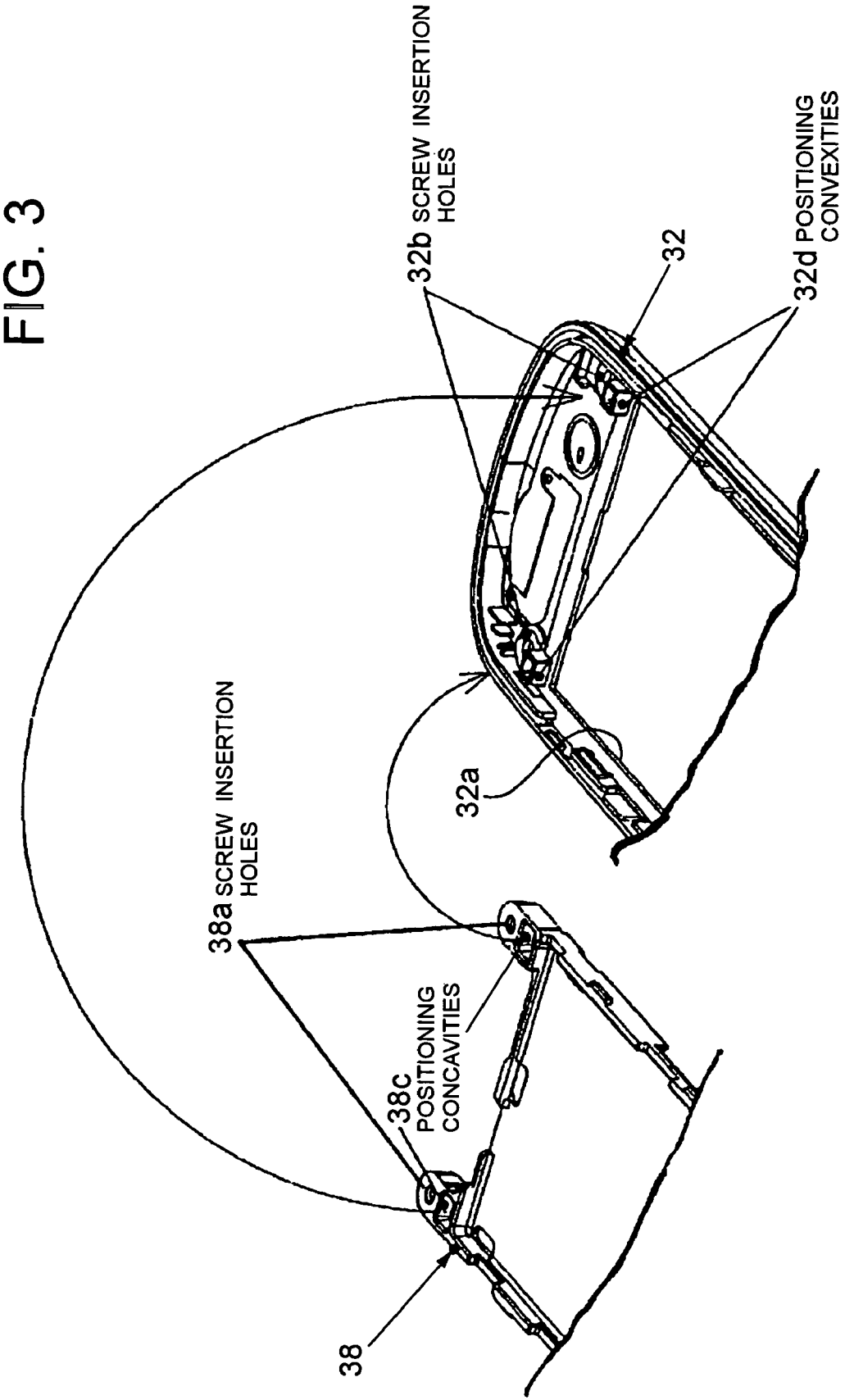
FIG. 3 is a partial exploded perspective view of a top cover and a built-in frame.
Figure 4:
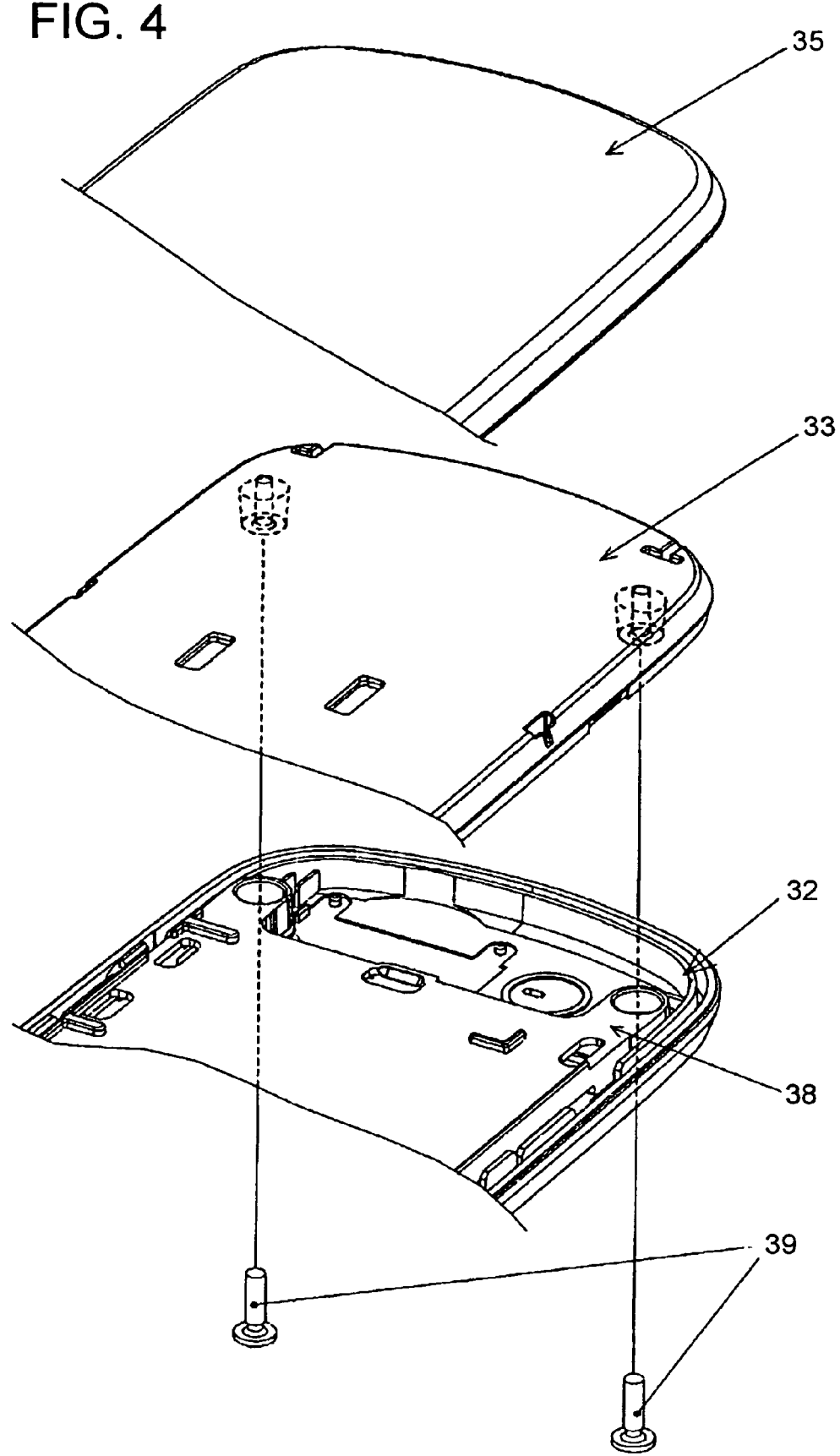
FIG. 4 is a partial exploded perspective view of a display section.
Figure 5:
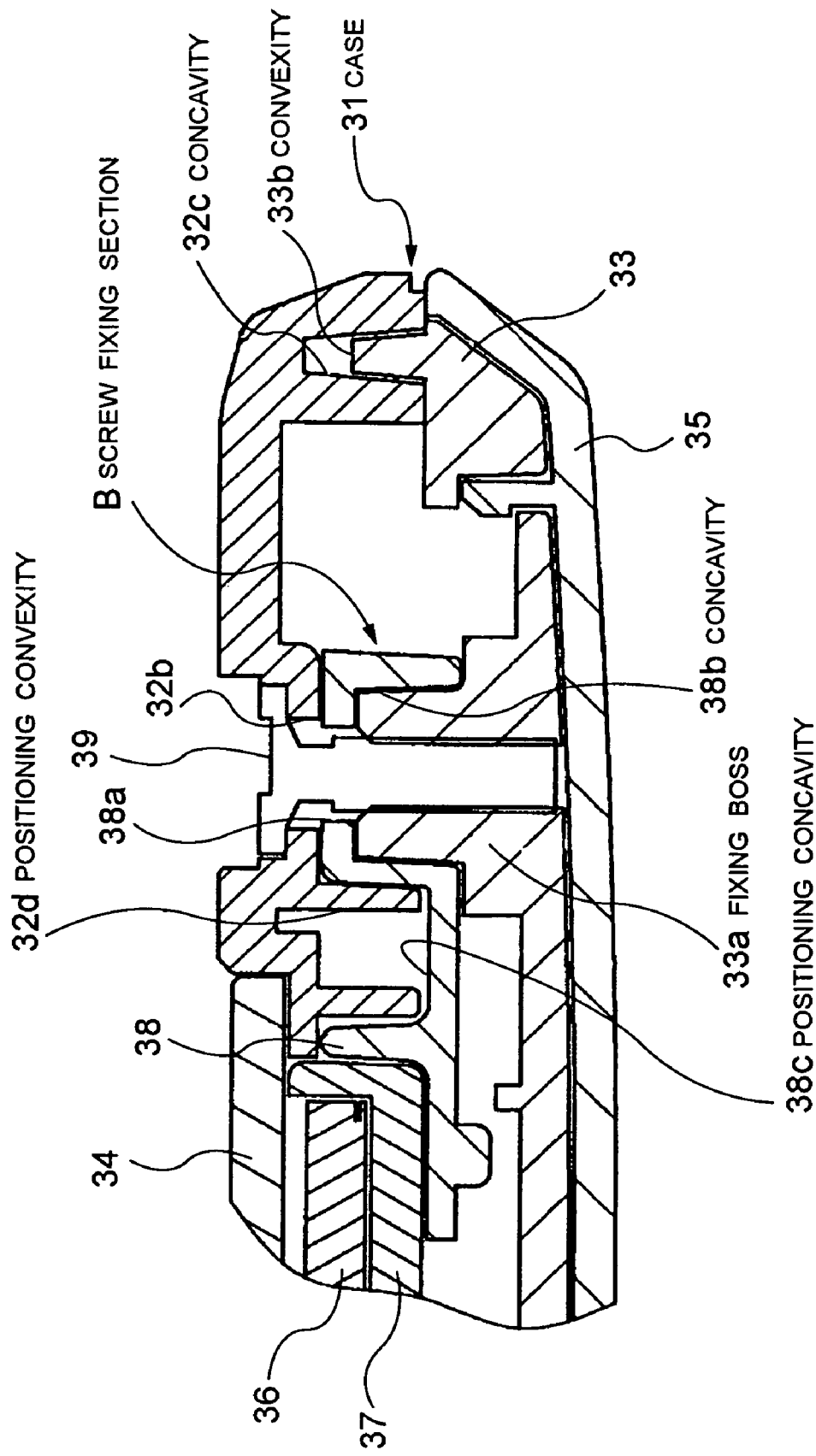
FIG. 5 is a sectional view of a display section taken along the line A-A of FIG. 1.

FIG. 1 is a perspective view of a cellular phone, FIG. 2 is an exploded perspective view of a display section, FIG. 3 is a partial exploded perspective view of a top cover and a built-in frame, FIG. 4 is a partial exploded perspective view of a display section, FIG. 5 is a sectional view of a display section taken along the line A-A of FIG. 1, and FIGS. 6A to 6H are each an explanatory diagram to show various kinds of embodiments of a positioning convexity.

As shown in FIG. 1, the cellular phone according to this embodiment is constructed by foldably connecting an operating section (a main body) 20 and a display section 30 together via a hinge section 10.

As shown in FIG. 2, the appearance of the display section 30 is constituted by top and bottom covers 32, 33 which constitute the case 31, a transparent panel 34 which is fitted in a display window 32a, and a decorative panel 35 which covers the bottom cover 33. In the interior of the case 31, there are incorporated a display panel 36 which displays characters and the like, a lighting unit 37 which lights the display panel 36 from the back surface thereof, and a built-in frame 38 which holds these members.

As shown in FIG. 2 to FIG. 5, multiple screw fixing sections B are formed in the display section 30. Each of the screw fixing sections B is constituted by a screw insertion hole 32b which are formed in the top cover 32, a screw insertion hole 32a which are formed in the built-in frame 38, a fixing boss 33a which are formed in the bottom cover 33, and a screw 39. That is, the screws 39 inserted into the screw insertion holes 32b, 38a of the top cover 32 and the built-in frame 38 are screwed into the fixing bosses 33a of the bottom cover 33, whereby the top cover 32 and the bottom cover 33 are fixed together and, at the same time, the built-in frame 38 is fixed in a co-tightened manner between the top cover 32 and the bottom cover 33.

Incidentally, in the assembling of the display section 30, the built-in frame 38 is first incorporated in the top cover 32, the bottom cover 33 is then fitted, and finally the screws 39 are tightened.

The positioning of the top cover 32 and the bottom cover 33 is performed by fitting together a concavity 32c, which is integrally formed on the inner surface of an outer end portion of the top cover 32, and a convexity 33b, which is integrally formed on the inner surface of an outer end portion of the bottom cover 33. The positioning of the bottom cover 33 and the built-in frame 38 is performed by fitting together the fixing boss 33a of the bottom cover 33 and a downward concavity 38b, which is integrally formed in the built-in frame 38. Furthermore, the positioning of the top cover 32 and the built-in frame 38 is performed by fitting together a positioning convexity 32d, which is integrally formed on the inner surface of the top cover 32, and an upward concavity 38c, which is integrally formed in the built-in frame 38.

The present invention is characterized by the shape and disposition of the positioning convexity 32d, and hereinafter the positioning convexity 32d will be described in detail.

Figure 6A:
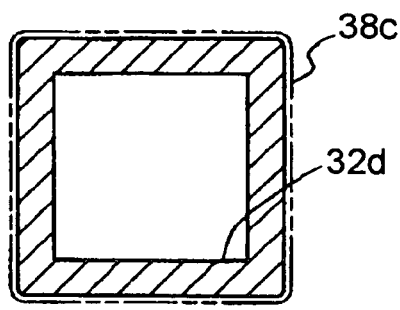
FIGS. 6A to 6H are each an explanatory diagram to show various kinds of embodiments of a positioning convexity.
Figure 6E:
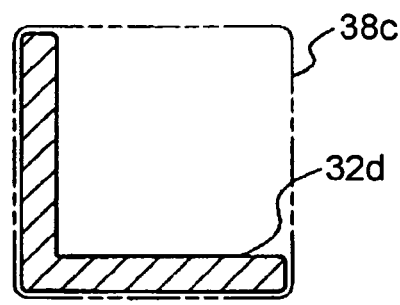

As shown in FIG. 5 and FIGS. 6A to 6H, the positioning convexity 32d is formed in the shape of a rib having continuity in a prescribed direction, and not in the form of a solid pin. The positioning convexity 32d is formed in the shape of, for example, a hollow box (a hollow quadrangle) as shown in FIG. 6A. When the positioning convexity 32d is formed in such a shape, it is possible to increase the strength of the positioning convexity 32d while suppressing the occurrence of a defective appearance such as shrinkage in the molding of the top cover 32. As a result, it becomes possible to prevent the breakage of the positioning convexity 32d due to impacts as caused by a fall by imparting strength high enough to withstand stress concentration to the positioning convexity 32d.

It is preferred that the positioning convexity 32d be formed from a rib which is continuous in at least two directions. Shapes which may be enumerated are, for example, a hollow quadrangle shown in FIG. 6A, a hollow triangle shown in FIG. 6B, a hollow circle shown in FIG. 6C, a cross (an X-shaped configuration) shown in FIG. 6D, an L-shaped configuration shown in FIG. 6E, a Π-shaped configuration shown in FIG. 6F, a C-shaped configuration shown in FIG. 6G, and a combination of L-shaped configurations shown in FIG. 6H. When the section of the positioning convexity 32d has such shapes, a large geometrical moment of inertia is obtained and the strength of the positioning convexity 32d can be increased.

Furthermore, it is preferred that the positioning convexity 32d be formed from a rib which is continuous in an endless manner. Shapes which may be enumerated are, for example, the hollow quadrangle shown in FIG. 6A, the hollow triangle shown in FIG. 6B, and the hollow circle shown in FIG. 6C. When the section of the positioning convexity 32d has such shapes, the geometrical moment of inertia is further increased and the strength of the positioning convexity 32d can be increased.

It is preferred that a curved surface or an inclined surface (chamfer) which guides the fitting into the positioning concavity 38c be formed in a leading end portion of the rib. This facilitates fitting together the positioning concavity 38c and the positioning convexity 32d and can improve the assemblability of the display section 30.

Figure 6B:
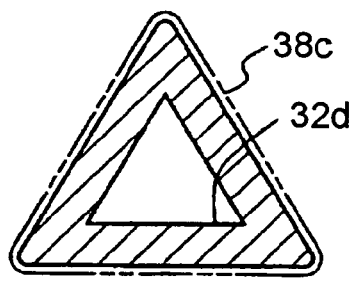
Figure 6F:
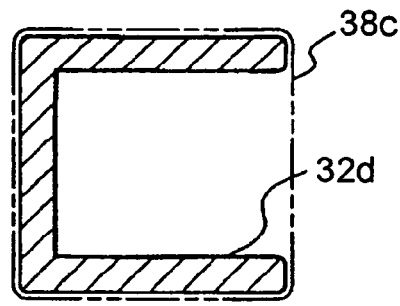
Figure 6C:
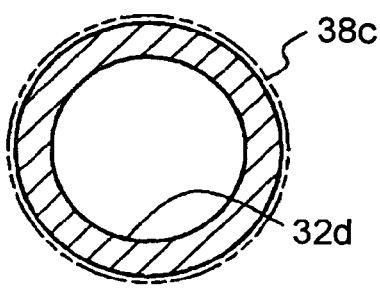
Figure 6G:
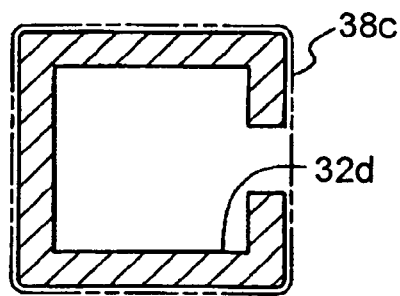
Figure 6D:
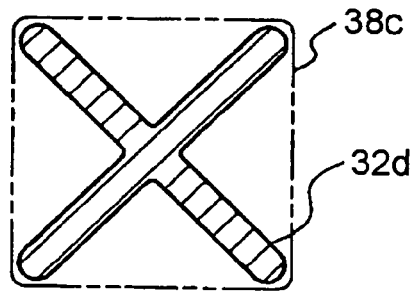
Figure 6H:
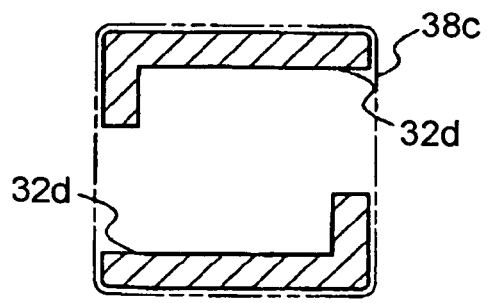
Figure 7:
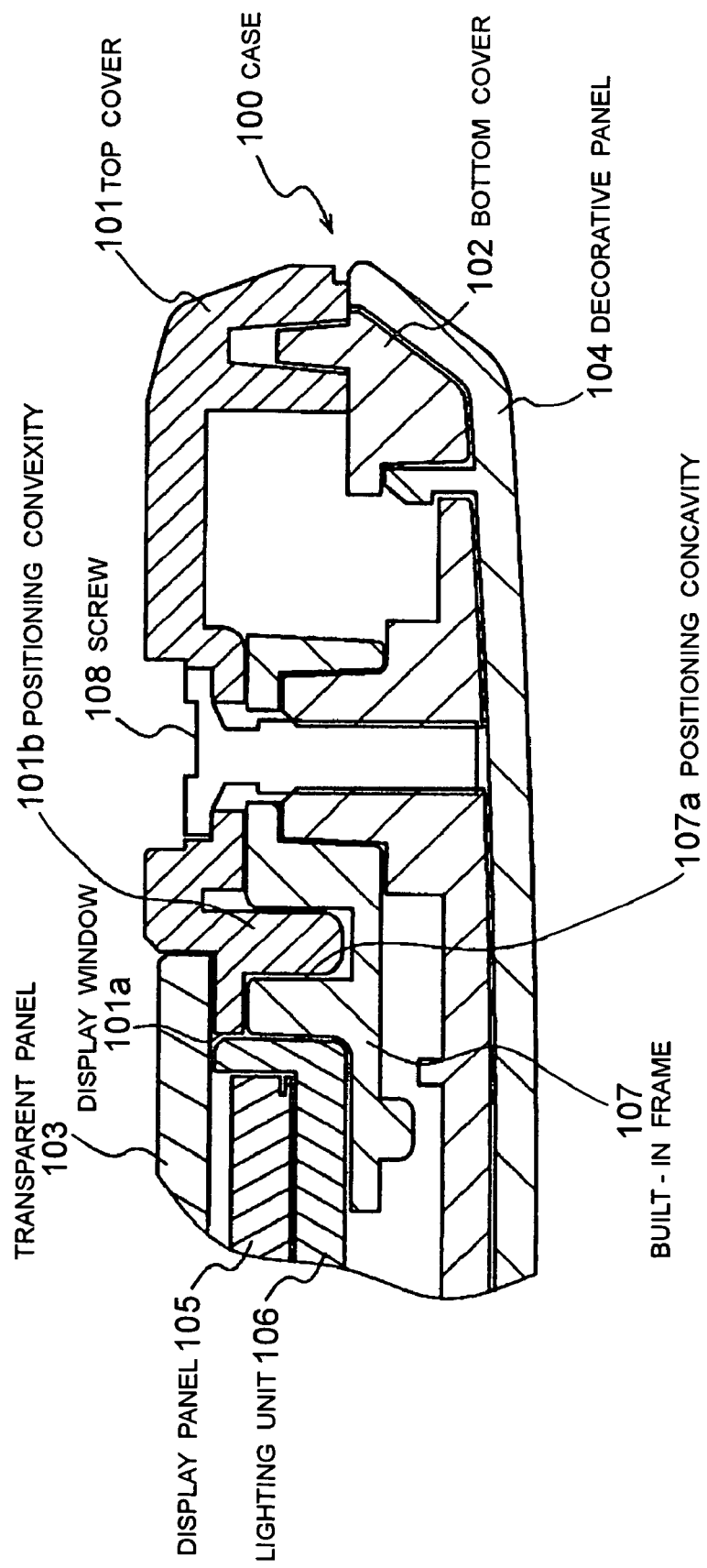
FIG. 7 is a partial sectional view of a cellular phone to show a positioning structure in a conventional example.
Figure 8:
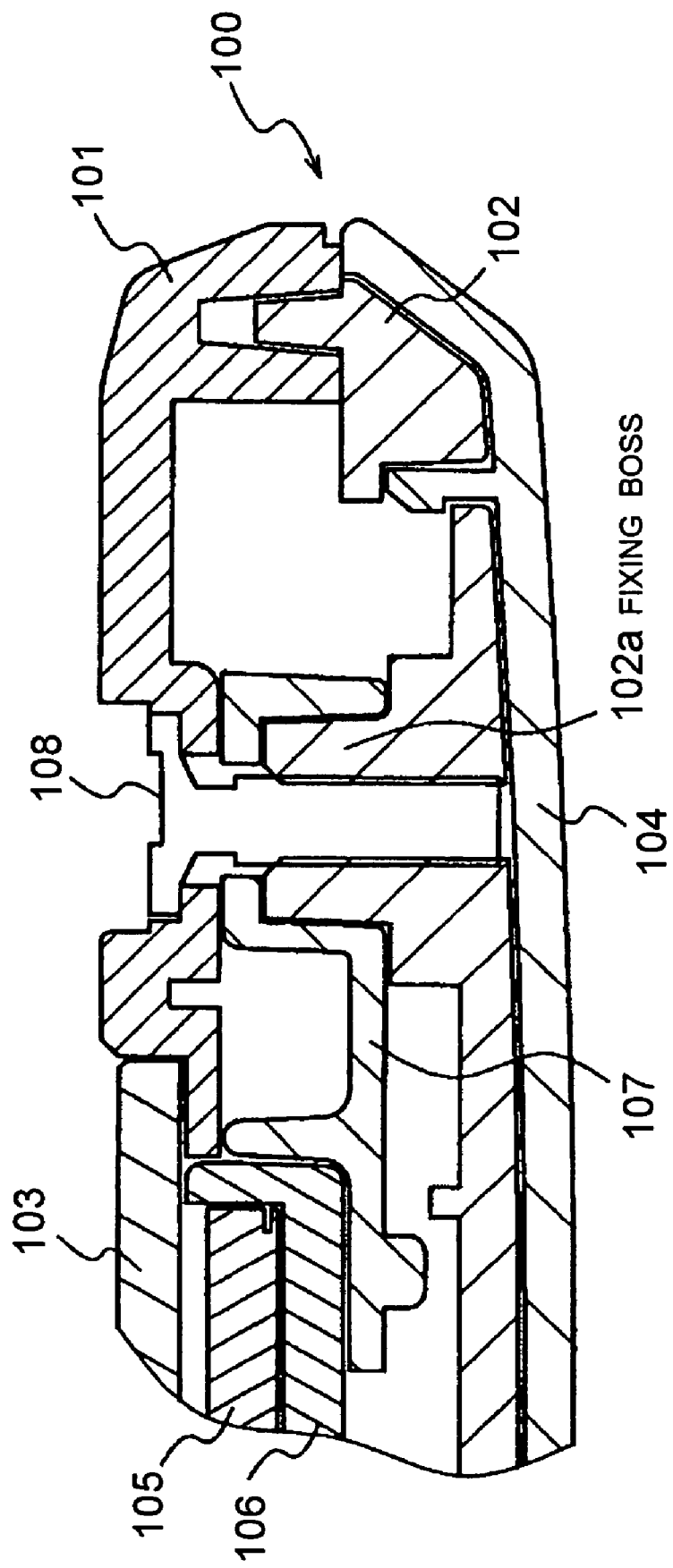
FIG. 8 is a partial sectional view of a cellular phone to show a positioning structure in another conventional example.

Incidentally, the shape of the positioning concavity 38c is not especially limited so long as the shape permits fitting onto the positioning convexity 32d. The shape of the positioning concavity 38c may be such that the shape fits along the whole outside shape of the positioning convexity 32d as shown in FIGS. 6A to 6C or fits partially along the outside shape of the positioning convexity 32d as shown in FIGS. 6D to 6H.

It is preferred that the positioning convexity 32d be disposed in the vicinity of the screw fixing section B. By disposing the positioning convexity 32d like this, in the vent of the deformation of the top cover 32 and the built-in frame 38 due to such impacts as caused by a fall, stress concentration on the positioning convexity 32d is lessened and the breakage of the positioning convexity 32d can be prevented.

When the positioning convexity 32d is disposed in the vicinity of the screw fixing section B, the screw insertion hole 32b of the top cover 32 and the screw insertion hole 38a of the built-in frame 38 can be positioned with good accuracy and, therefore, it is possible to resolve the problem that the screw 39 becomes slant during tightening, resulting in incomplete fastening and the problem that the tightening force of the screw 39 works on the positioning convexity 32d, thereby breaking the positioning convexity 32d.

According to the cellular phone of this embodiment constructed as described above, in performing the positioning of the top cover 32 and the built-in frame 38 by fitting together the positioning concavity 38c, which is formed in the built-in frame 38, and the positioning convexity 32d, which is integrally formed on the inner surface of the top cover 32, because of the formation of the positioning convexity 32d from a rib, it becomes possible to increase the strength of the positioning convexity 32d without causing a defective appearance in the top cover 32. As a result of this, it is possible to prevent the breakage of the positioning convexity 32d due to a fall and the like by imparting strength high enough to withstand stress concentration to the positioning convexity 32d.

When the positioning convexity 32d is formed from a rib which is continuous in at least two directions, the strength of the positioning convexity 32d can be increased by adopting a hollow quadrangle, a hollow triangle, a hollow circle, a cross, an X-shaped configuration, an L-shaped configuration, a Π-shaped configuration and a C-shaped configuration, etc. as the sectional shape of the positioning convexity 32d.

When the positioning convexity 32d is formed from a rib which is continuous in an endless manner, the strength of the positioning convexity 32d can be further increased by adopting a hollow quadrangle, a hollow triangle, a hollow circle, etc. as the sectional shape of the positioning convexity 32d.

When the positioning convexity 32d is disposed in the vicinity of the screw fixing section B which fixes at least the built-in frame 38 to the top cover 32, stress concentration on the positioning convexity 32d can be lessened when the positioning convexity 32d is subjected to such impacts as caused by a fall. In addition, because the screw insertion holes 32b, 38a of the top cover 32 and the built-in frame 38 can be positioned with good accuracy, it is also possible to resolve the problem that during tightening, the screw 39 becomes slant and the tightening force of the screw 39 works on the positioning convexity 32d, with the result that the positioning convexity 32d is broken.

When a curved surface or a slant surface which guides the fitting into the positioning concavity 38c is formed in a leading end portion of a rib which constitutes the positioning convexity 32d, this facilitates fitting together the positioning concavity 38c and the positioning convexity 32d and, therefore, the assemblability of the cellular phone can be improved.

Incidentally, the present invention is not limited by the above-described embodiment.

For example, although in the above-described embodiment, the positioning convexity is formed on the top cover and the fixing boss is formed in the bottom cover, the positioning convexity and the fixing boss may be formed in the same cover.

Although in the above-described embodiment, the positioning convexity is disposed in the vicinity of the inner_side of the screw fixing section, the positioning convexity may be disposed in the vicinity of the right and left of the screw fixing section or in the vicinity of the outer side thereof.

Although in the above-described embodiment, the built-in frame is fixed in a co-tightened manner-between the top and bottom covers, the built-in frame may be screw-fixed to either of the top and bottom covers and the positioning convexity can be disposed in the vicinity of a screw fixing section.

Although in the above-described embodiment, a cellular phone is exemplified, the positioning structure (positioning method) of the present invention is useful also in mobile communication terminals other than a cellular phone and devices other than a mobile communication terminal.

By the fitting of a positioning convexity which is integrally formed on the inner surface of a case into a positioning concavity which is formed in an incorporated member, the present invention can be applied to equipment which performs the positioning of the case and the incorporated member. The present invention is also useful, in particular, in mobile communication terminals which may be subjected to such impacts as caused by a fall.

What is claimed is:

1. A positioning structure which positions an incorporated member which is to be incorporated in a case with respect to the case, comprising:

a positioning concavity which is formed in the incorporated member; and a positioning convexity which is integrally formed on an inner surface of the case and positions the incorporated member by fitting into the positioning concavity, wherein the positioning convexity comprises two protrusions extending into the positioning concavity, wherein the two protrusions are connected to one another by a member extending from ends of the two protrusions such that the member is positioned adjacent and substantially parallel to a portion of the positioning concavity, and wherein arrangement of the two protrusions and the member is configured to form an enclosed hollow cavity between the two protrusions and the member.

2. The positioning structure according to claim 1, wherein the positioning convexity does not occupy a majority of the space created by the positioning concavity.

3. The positioning structure according to claim 1, wherein the positioning convexity is not a single solid protrusion.

4. The positioning structure according to claim 1, wherein the hollow cavity is substantially rectangular.

5. The positioning structure according to claim 1, wherein a curved surface or an inclined surface which guides the fitting into the positioning concavity is formed in a leading end portion of the two protrusions.

6. A positioning method for positioning an incorporated member which is to be incorporated in a case with respect to the case, comprising the steps of:

integrally forming a positioning convexity on an inner surface of the case; and fitting the positioning convexity into a positioning concavity which is formed in the incorporated member, thereby positioning the incorporated member, wherein the positioning convexity comprises two protrusions extending into the positioning concavity, wherein the two protrusions are connected to one another by a member extending from ends of the two protrusions such that the member is positioned adjacent and substantially parallel to a portion of the positioning concavity, and wherein arrangement of the two protrusions and the member is configured to form an enclosed hollow cavity between the two protrusions and the member.

7. The positioning method according to claim 6, wherein the positioning convexity does not occupy a majority of the space created by the positioning concavity.

8. The positioning method according to claim 6, wherein the positioning convexity is not a single solid protrusion.

9. The positioning method according to claim 6, wherein the hollow cavity is substantially rectangular.

10. The positioning method according to claim 6, wherein a curved surface or an inclined surface which guides the fitting into the positioning concavity is formed in a leading end portion of the two protrusions.

11. A case in which an incorporated member is to be incorporated, the case integrally containing a positioning convexity which positions the incorporated member by fitting into a positioning concavity which is formed in the incorporated member, wherein the positioning convexity comprises two protrusions extending into the positioning concavity, wherein the two protrusions are connected to one another by a member extending from ends of the two protrusions such that the member is positioned adjacent and substantially parallel to a portion of the positioning concavity, and wherein arrangement of the two protrusions and the member is configured to form an enclosed hollow cavity between the two protrusions and the member.

12. The case according to claim 11, wherein the positioning convexity does not occupy a majority of the space created by the positioning concavity.

13. The case according to claim 11, wherein the positioning convexity is not a single solid protrusion.

14. The case according to claim 11, wherein the hollow cavity is substantially rectangular.

15. The case according to claim 11, wherein a curved surface or an inclined surface which guides the fitting into the positioning concavity is formed in a leading end portion of the two protrusions.

16. A mobile communication terminal having a case in which a built-in frame is to be incorporated, comprising:

a positioning concavity which is formed in the built-in frame; and a positioning convexity which is integrally formed on an inner surface of the case and positions the built-in frame by fitting into the positioning concavity, wherein the positioning convexity comprises two or more protrusions extending into the positioning concavity, wherein the two protrusions are connected to one another by a member extending from ends of the two protrusions such that the member is positioned adjacent and substantially parallel to a portion of the positioning concavity, and wherein arrangement of the two protrusions and the member is configured to form an enclosed hollow cavity between the two protrusions and the member.

17. The mobile communication terminal according to claim 16, wherein the positioning convexity does not occupy a majority of the space created by the positioning concavity.

18. The mobile communication terminal according to claim 16, wherein the positioning convexity is not a single solid protrusion.

19. The mobile communication terminal according to claim 16, wherein the hollow cavity is substantially rectangular.

20. The mobile communication terminal according to claim 16, wherein a curved surface or an inclined surface which guides the fitting into the positioning concavity is formed in a leading end portion of the two protrusions.

* * * * *